April 6, 1965 J. W. ELDRED ETAL 3,176,824
LOADER
Filed April 19, 1963 7 Sheets-Sheet 1

Fig. 1

INVENTORS.
JOHN W. ELDRED
JAMES B. LEGG
BY MAHONEY, MILLER & RAMBO
BY Wm. V. Miller
ATTORNEYS.

April 6, 1965

J. W. ELDRED ETAL 3,176,824

LOADER

Filed April 19, 1963

INVENTORS.
JOHN W. ELDRED
JAMES B. LEGG
BY
MAHONEY, MILLER & RAMBO
BY
ATTORNEYS.

April 6, 1965 J. W. ELDRED ETAL 3,176,824
LOADER
Filed April 19, 1963 7 Sheets-Sheet 7

INVENTORS.
JOHN W. ELDRED
JAMES B. LEGG
BY MAHONEY, MILLER & RAMBO
BY Wm. V. Miller
ATTORNEYS.

United States Patent Office 3,176,824
Patented Apr. 6, 1965

3,176,824
LOADER
John W. Eldred and James B. Legg, Columbus, Ohio, assignors to The Eldred Company, Columbus, Ohio, a corporation of Ohio
Filed Apr. 19, 1963, Ser. No. 274,195
9 Claims. (Cl. 198—25)

This invention relates to a loader. More specifically, it relates to a loader which will receive articles in upright position from a continuously moving supply conveyor and transfer them to and load them on, while upright, an intermittently indexing machine designed to perform some operation on them. In its specific application, the invention is disclosed as an article transfer unit which will receive glassware articles and transfer them to and load them on a glassware decorating machine.

The loader disclosed herein receives the glassware articles from a feed conveyor which supplies them in upright position and in successively spaced relationship. The loader operates continuously to take the articles successively from the feed conveyor and supply them to the intermittently indexing decorating machine. The loader includes article-engaging fingers which are pivotally mounted on a continuously rotatable support and which travel over an arcuate support plate or table extending between the discharge end of the feed conveyor and the loading station of the decorating machine. Fixed cams are mounted in cooperation with the movable support and cooperate with followers carried by the respective fingers to control the swinging thereof. It is important that as each finger moves the associated upright article along the arcuate table into loading position on the decorating machine, it accurately centers it in such position and then quickly moves out of the way of the next article being moved into the same loading position. The cams of the loader are so designed and located that they cooperate with the cam followers on the fingers to accomplish this. Separate cams cooperate with separate respective followers on the various fingers, one cam and cooperating follower serving to control the respective finger during a portion of its travel and another cam and a different cooperating follower serving to control the same finger during the remainder of its travel. This control of the continuously traveling fingers is in timed relationship to the intermittent movement of the decorating machine to be loaded.

In the accompanying drawings, loaders embodying this invention are illustrated but it is to be understood that specific details thereof may be varied without departing from basic principles of the invention.

In these drawings:

FIGURE 6 is enlarged, vertical sectional view taken along line 6—6 through the loader of FIGURE 5.

FIGURE 8 is a similar view illustrating both articles in stopped loading positions.

Figure 1:
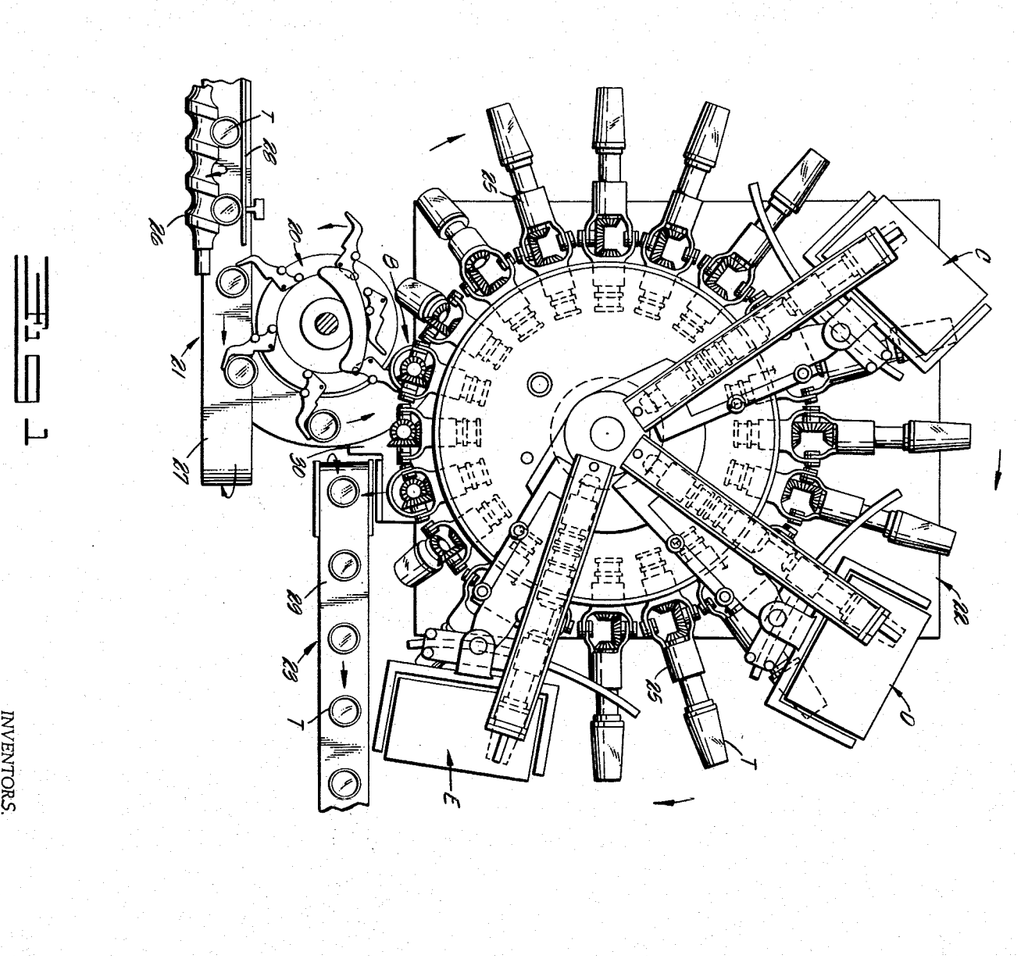
FIGURE 1 is a plan view showing a loader embodying this invention in combination with a glassware decorating machine.

One form of the loader embodying this invention is indicated generally at 20 in FIGURE 1. It may be used for loading various articles but in the example shown, it is used for loading glassware, such as the tapered tumblers T. These tumblers are supplied from a continuously moving feed conveyor 21, are removed therefrom by the continuously driven loader and then transferred to and loaded onto an intermittently indexing, turret-type machine 22 which is illustrated as being a decorating machine but may be a machine for performing other operations. The articles are suitably removed from the decorating machine as by a continuously moving discharge conveyor 23. It will be noted that the feed conveyor 21 is a straight-line conveyor which is substantially tangent to the loader 20, that the loader is between that conveyor and the machine 22, and that the loader is of generally circular form and is located substantially tangent to the machine 22 between the machine and the feed conveyor 21. It will also be noted that the discharge conveyor 23 is a straight-line conveyor that is tangent to the machine 22 and is disposed substantially radially of the loader 20.

The details of the decorating machine 22 are not important to the present invention which deals with the loader 20. It is designed to be loaded with successive tumblers T with the tumblers in an upright position between the intervals when it is intermittently indexing. The decorating machine 22 illustrated is of the general structure disclosed in the copending application of Eldred et al., Ser. No. 129,455, filed August 4, 1961, now Patent No. 3,096,709, issued July 9, 1963. It is of the turret-type and rotates intermittently in a clockwise direction. It comprises a number of spindles 25 which are carried at angularly spaced intervals. The machine is rotated intermittently to properly index the machine, the loader of FIGURES 1-4, inclusive, being used with a machine which in each step moves a distance equal to the angular spacing between adjacent spindles. During this step-by-step rotation, the spindles 25 are moved from a vertical dependent position at the decorating machine loading transfer station B to a horizontally or radially extending position as the machine rotates to and past successive decorating stations C, D and E, and finally back to a depending position at the unloading transfer station F.

The feed conveyor 21 is of a suitable type to supply the loader 20 with the articles T which are uniformly spaced on the conveyor by means of an outer driven screw 26 extending longitudinally along one edge of the continuously moving belt 27. The screw cooperates with a fixed inner guide rod 28 along the opposite edge of the conveyor belt.

The discharge conveyor 23 may be of any suitable type to take away the articles from the decorating machine and is shown as including a continuously driven belt 29. The decorated articles are deposited on a horizontal plate or table extension 30 (FIGURES 1 and 2) carried by the loader adjacent the inner end of the conveyor belt 29 and are blownoff such extension onto the belt 29, at properly timed instants, by means of a timed air jet 31.

Figure 2:
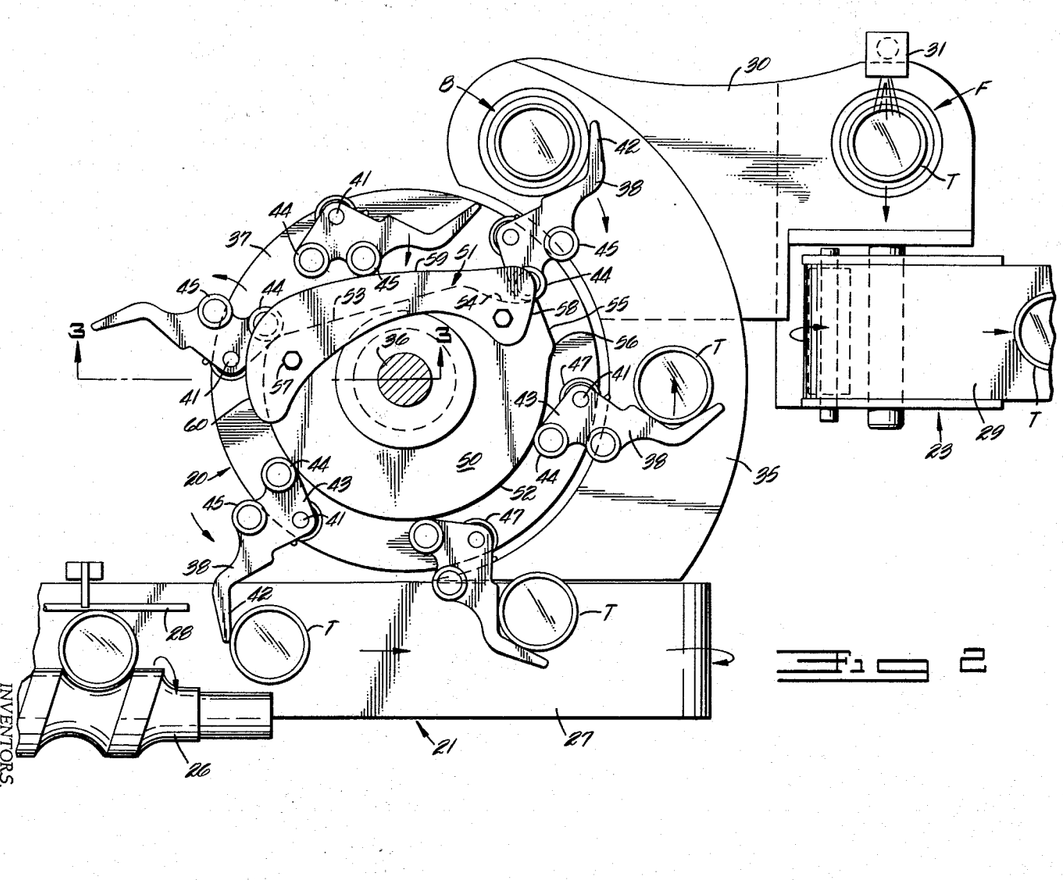
FIGURE 2 is an enlarged plan view of the loader and associated units.
Figure 3:
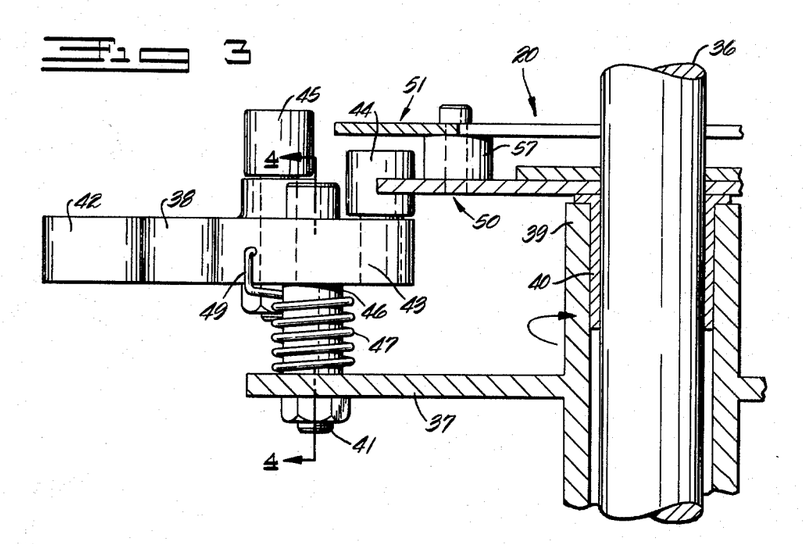
FIGURE 3 is an enlarged, vertical sectional view taken along line 3—3 of FIGURE 2 through a portion of the loader.
Figure 4:
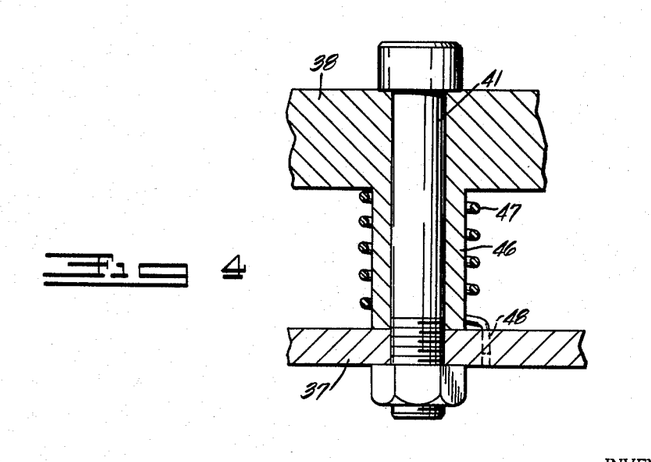
FIGURE 4 is a detail in vertical section taken along line 4—4 of FIGURE 3.

The loader 20 which embodies this invention is shown best in FIGURES 2, 3 and 4. It includes an arcuate horizontal plate or table 35 extending from the inner side edge of the conveyor belt 27 to the loading station B of the decorating machine 22 and which is concentric with the vertically disposed main support column 36 of the loader. Mounted on the column 36 for rotation about the column is a carrier 37 which carries the article-engaging levers 38. The member 37 is mainly of disc-form and has a central hub or sleeve 39 which is rotatably mounted on the column 36 by means including the upper bushing 40. The carrier 37 is driven continuously in a counterclockwise direction (FIGURE 2) in any suitable manner (not shown) such as by a drive geared to the hub 39 thereof. The levers 38 are pivotally mounted on the upper surface of the carrier 37 at angularly spaced intervals by the pivots 41, six of them being shown but they may be provided in other numbers.

Each of the levers 38 is in effect a bell crank lever and comprises the outer article-engaging finger 42 and the inner pivoted roller-carrying portion 43. The edge opposite the pivoted corner carries a pair of cam-engaging followers in the form of an inner roller 44 and an outer roller 45. As will be apparent from FIGURE 3, the roller 45 is at a higher level than the roller 44. It will be noted that the finger 42 is of open angular form so that when it engages an article, it will be automatically centered relative thereto. The pivots 41 include means for biasing the levers 38 so that they tend to swing in a clockwise direction and normally position the fingers 42 radially outwardly of the carrier 37. It will be noted from FIGURES 3 and 4, that each lever 38 has a depending sleeve spacer portion 46 and that the pivot 41 is a bolt which extends downwardly therethrough and through an aligning opening in the carrier 37. Surrounding the sleeve portion 46 is a torsion spring 47 which has its lower end 48 anchored in the corner and its upper end 49 in engagement with one edge of the lever 38. Thus, this spring biases the lever 38 in a clockwise direction about the pivot bolt 41.

Swinging of the levers 38 about their pivots 41 as the carrier 37 rotates is controlled by means of a double cam structure which is non-rotatably carried by the standard 36. This double cam structure comprises the separate lower and upper cams 50 and 51, respectively.

The cam 50 is mainly of disc form and is provided with a cam edge 52 which is a substantial part of a circle, the arc of which is concentric with the axis of the carrier 37 and the standard 36 which carries it. The circle is flattened adjacent the loading station B to provide a straight cam edge 53 which is joined adjacent the loading station to the arcuate cam edge 52 by means of a re-entrant curved edge 54 and a straight edge 55 substantially at right angles to the edge 53. Where the edge 55 joins the edge 53, a node 56 is produced. The cam 50 is suitably fixed on the column 36, resting on the upper end of the bushing 40.

The cam 51 is of elongated form, lying above the straight edge 53 of the cam 50 and attached to the cam in a position spaced thereabove, by means of the bolt and spacer units 57. The end of the cam adjacent the loading station is provided with a short substantially flat edge 58 which joins a long flat edge 59 at right angles thereto, the latter edge merging into a curve 60 at the opposite or outer end of the cam.

It will be apparent from FIGURE 3 that the rollers 44 engage the cam 50 and the rollers 45 engage the cam 51. As the carrier 37 rotates and the levers 38 move successively toward the belt 27, the rollers 44 engaging the cam edge 52 of the cam 50, will be positioned outwardly of the carrier and will swing over the belt 27 so that their fingers 42 will engage the successively uniformly spaced articles on the belt. The articles will be centered in the successive fingers 42 and will be pushed off the belt onto the arcuate plate 35 and will be slid along that plate toward the loading station B, the lower rollers 44 still being in engagement with the cam edge 52. As each lever 38 and the article carried thereby approaches the loading station, the roller 44 thereof engages the cam node 56 which swings the finger 42 inwardly to more accurately align the article with the loading station B. The cam edge 55 is substantially tangent to the loading position and the roller 44 will move along that edge causing the article to travel substantially straight toward the loading station. As the article centered in the finger 42 reaches the loading station where it is accurately centered, the roller 44 engages the re-entrant curved edge 54 and begins to swing back away from the article. Shortly thereafter, the upper roller 45 engages the cam edge 58 of the cam 51 and control of the article-engaging lever 38 passes to the upper cam 51. The lower roller 44 will travel along the straight edge 53 of the cam 50 but the upper roller 45 will be in control, being in engagement with the straight edge 59 of the upper cam 51. This action will serve to quickly swing the finger 42 backwardly out of engagement with the centered article at the loading station and position the finger so that as it moves on, it will clear the centered article and will move out of the way of the next oncoming article. Control of the lever 38 by the roller 45 will continue until the roller 45 moves off the end of the cam 51 and the roller 44 again engages the curved cam edge 52 of the cam 50. Thus, control of the article-engaging members shifts from the lower cam and cooperating lower rollers to the upper cam and cooperating upper rollers to obtain quick clearance of the article-engaging fingers relative to the centered article at the loading station and oncoming articles.

In FIGURES 5 to 8, there is illustrated a loader 20a which is designed to feed two articles simultaneously into a loading station where two articles are simultaneously loaded. This can be a machine like the decorating machine 22 of FIGURE 1 except that it will index two spindles 25 at a time into the loading station B rather than one. Basically, this loader is the same as that previously described except that instead of using one pair of cams for controlling all the article-engaging levers, two pairs of cams are provided for that purpose, with each pair controlling alternate arms.

Figure 5:
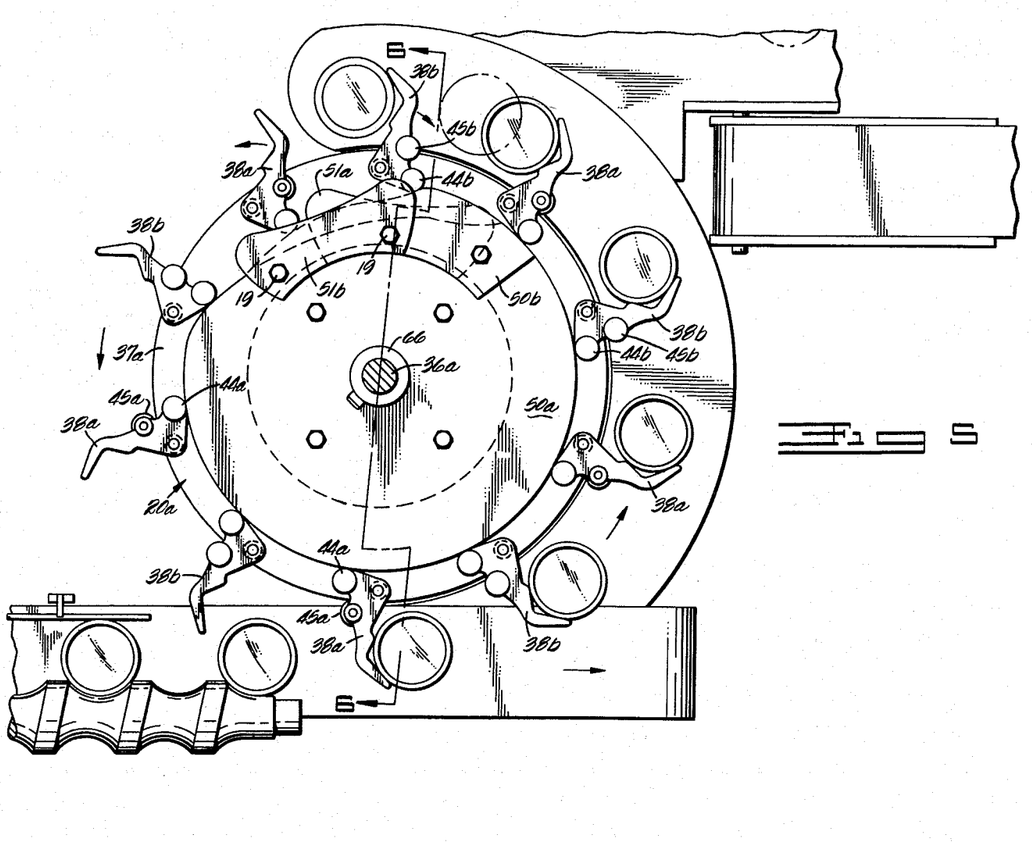
FIGURE 5 is a plan view of a loader which loads two articles at a time as distinguished from the loader of FIGURE 1 which loads a single article.

Thus, as shown in FIGURES 5 and 6, the carrier 37a carries two sets of levers which are designated 38a and 38b, respectively, the arms being in alternating sequence and each set having five arms for a total of ten, but other numbers may be provided. The levers 38a are practically identical with the levers 38 previously described and are provided with similarly located inner and outer rollers 44a and 45a, respectively, disposed at different levels. The arms 38b are almost identical but have the inner and outer rollers 44b and 45b located at different levels from the rollers 44a and 45a and at different levels from each other.

Figure 7:
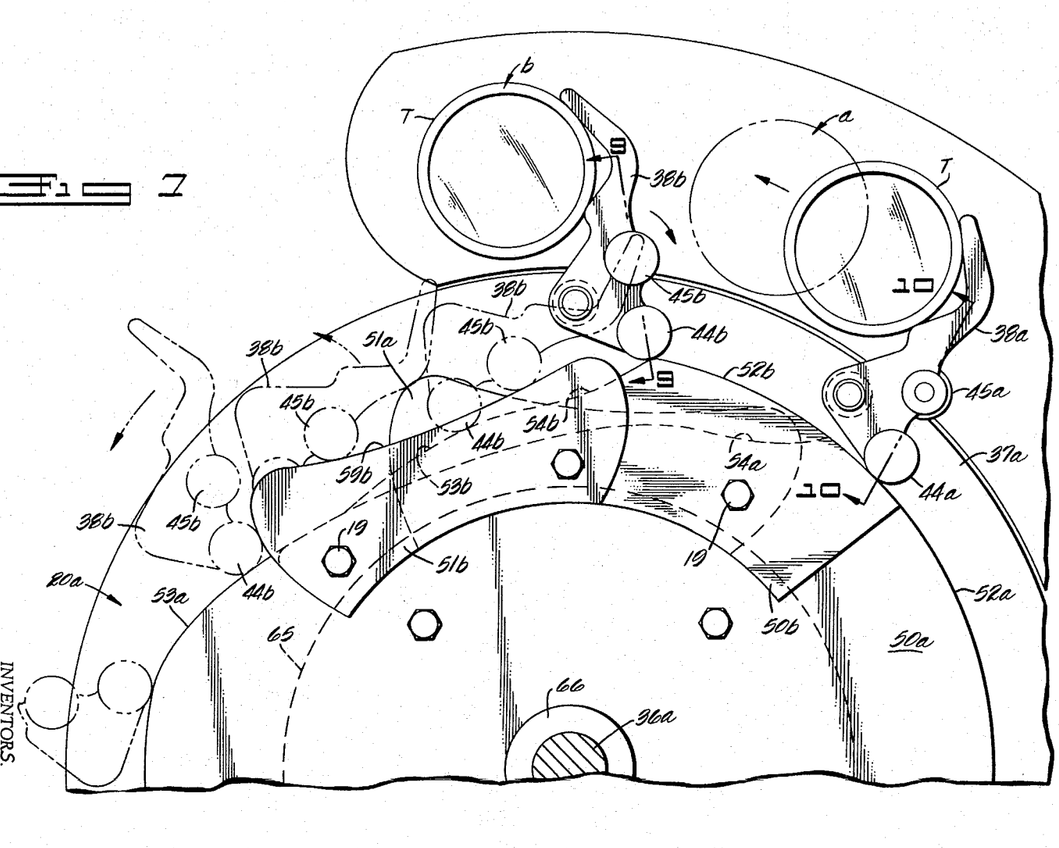
FIGURE 7 is a diagrammatic view illustrating one article in stopped loading position and the next article moving toward loading position.
Figures 9, 10, 11:
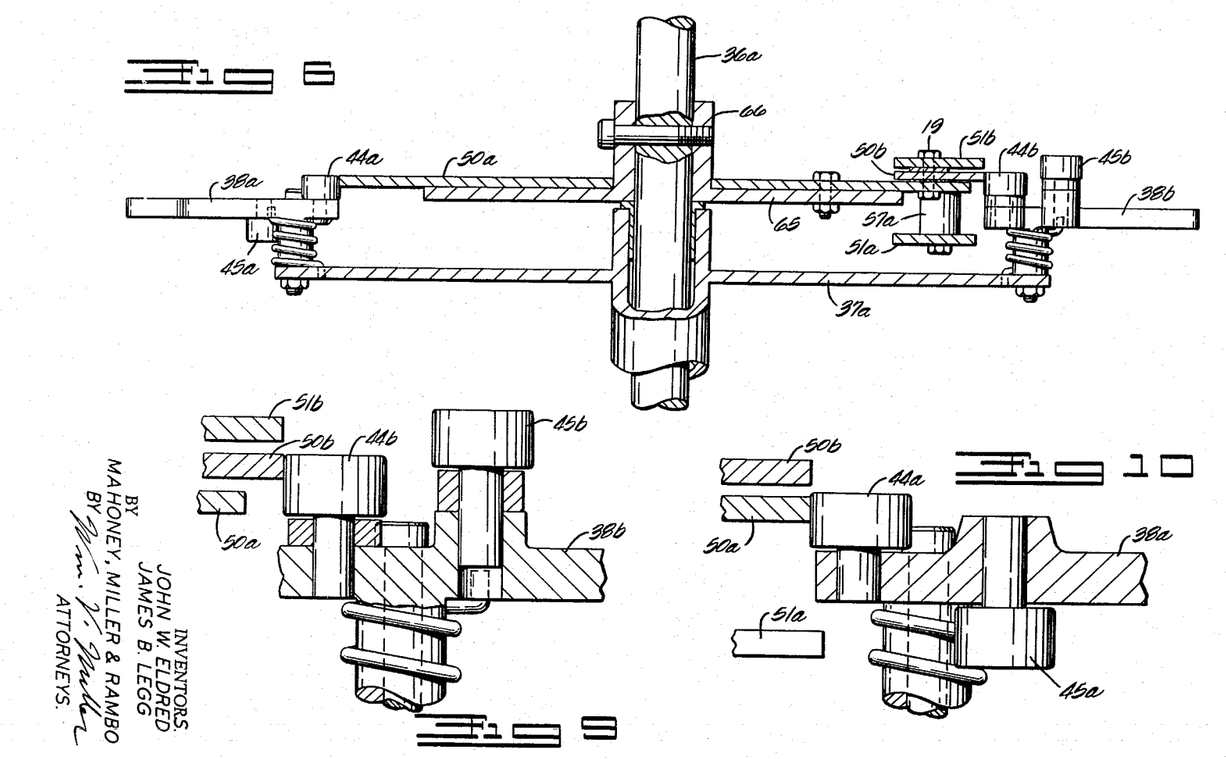
FIGURE 9 is an enlarged, vertical sectional view taken along line 9—9 of FIGURE 7.
FIGURE 10 is a similar view taken along line 10—10 of FIGURE 7.
Figure 11:
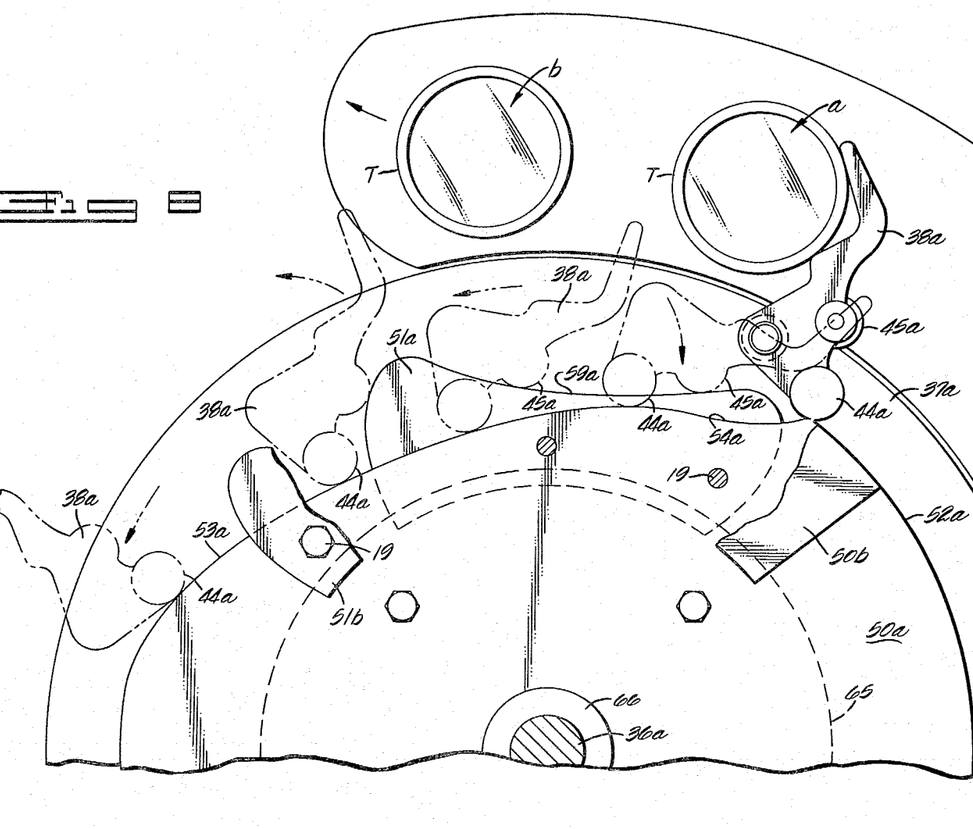

A pair of carriers, consisting of the cams 50a and 51a, is mounted on the standard 36a for cooperating with the respective rollers 44a and 45a of the levers 38a. The cam 50a is mounted on and bolted to a disc 65 which is provided with a hub 66 that surrounds the standard 36a and is bolted thereto. The cam 51a is secured below the cam 50a by means of bolt and spacer units 57a (FIGURE 6). A pair of cams, consisting of the carriers 50b and 51b, is mounted on the cam 50a for cooperating with the respective rollers 44b and 45b of the levers 38b. The cams 50b and 51b are in superimposed spaced relationship above the cam 50a and are bolted thereto by the bolts 19. All the cams 51a, 50b, and 51b are located adjacent the loading station whereas the cam 50a, similar to the cam 50, is mainly of circular form but has a flattened edge 53a, its arcuate edge 52a extending the greater portion of the distance around the loader 20a. The flat edge 53a includes a re-entrant curved edge 54a adjacent the first loading position a (FIGURE 8). The cam 51a that cooperates with the cam 50a in controlling the levers 38a is illustrated in its relationship to the cam 50a in FIGURE 8. It will be noted that it has a control edge 59a which is almost flat but curved inwardly slightly and which extends from the re-entrant edge 54a of the cam 50a a substantial extent along the edge 53a of the cam 50a but in outwardly spaced relationship relative thereto. The rollers 44a of the levers 38a will cooperate only with the cam 50a and the roller 45a of the levers 38a will cooperate only with the cam 51a. However, the rollers 44b of the levers 38b are positioned to cooperate with both the cams 50a and 50b and the roller 45b will engage both the cams 50b and 51b which will be apparent from FIGURE 8. The relationship of the cams 50b and 51b which control the levers 38b is illustrated in FIGURE 7. The edge 52b of the cam 50b is a continuation of the arcuate edge 52a of the cam 50a and extends to a point adjacent the second loading position b where it joins a re-entrant curve 54b and then the flat edge 53b of the cam 50b continues in spaced relationship to the edge 53a of the cam 50a and finally into merging relationship therewith as shown in FIGURE 7. The control edge 59b of the cam 51b, which is substantially flat but indented slightly, starts at the re-entrant edge 54b of the cam 50b and runs beyond the merging edges 53b and 53a, respectively, of the cams 50b and 50a.

With the described relationship of the two pairs of control cams, the respective levers 38a and 38b will be properly controlled in their movements as the carrier 37a rotates to move a pair of articles into the loading positions a and b at the loading station B, as will be apparent from an examination of FIGURES 7 and 8. Although the position a is the first reached by the levers and is referred to as the first position, it is actually the second loaded, the position b being the first loaded. Thus, in FIGURE 7, the position b has an article centered thereat and the next article is still moving toward the position a. An understanding of this action will be simplified if only the action of the two arms 38b and 38a, shown in FIGURE 7, is considered. The arm 38a is still under the control of the roller 44a engaging the cam edge 52a of the cam 50a. The arm 38b is under control of the cam edge 52b of the cam 50b since the roller 44b is in engagement therewith. The roller 44b is just ready to move onto the re-entrant edge 54b at which time the roller 45b will take over control of the lever 38b by engaging with the edge 59b of the cam 51b. This action is shown by broken lines to the left of FIGURE 7 which indicate the successive positions of the lever 38b in quickly swinging inwardly to clear it from the article which is stopped at position b. The roller 45b will eventually move off the cam 51b at which time the roller 44b will take over control of the lever 38b by contacting with the edge 53a and eventually the edge 52a of the cam 50a. The movement of the lever 38a is not shown in this figure.

As previously indicated, as the previous article is centered in position b, the next article is moving into position a. The action of the lever 38a in moving the second article from the position shown in FIGURE 7 to its final position shown in FIGURE 8 is indicated in this latter figure. Until the article reaches its centered position a under control of the lever 38a, the lever is under control of its roller 44a cooperating with the cam edge 52a of the cam 50a. However, at the time the final position of the article is reached, the roller 44a moves onto the re-entrant edge 54a and the roller 45a takes over control to quickly move the arm 38a inwardly into a retracted non-interfering position. The successive positions of the lever 38a are shown by the broken line positions to the left of FIGURE 8, the arm 38a only being shown. The roller 45a takes over control of the arm 38a by contacting with the edge 59a of the cam 51a. Eventually the roller 45a will move off the edge 59a of the cam 51a and control of the lever 38a will again be taken over by the roller 44a which will first engage the edge 53a and then the edge 52a of the cam 50a.

It will be apparent from the above that this invention provides a transfer machine or loader in which the article-engaging levers or fingers will sweep the successive articles off the supply conveyor and locate and center them at a loading station. To accomplish this and so that the levers move quickly out of article-disengaging or loading position so as to avoid interference, each lever is controlled by a pair of separate cam followers or rollers which cooperate respectively with separate cams. One cam and roller controls the lever from the article-engaging position until it reaches the article-disengaging or loading position and then another cam and roller takes over to quickly move the lever into disengaged non-interfering position.

According to the provisions of the patent statutes, the principles of this invention have been explained and have been illustrated and described in what is now considered to represent the best embodiment. However, it is to be understood that, within the scope of the appended claims, the invention may be practiced otherwise than as specifically illustrated and described.

Having thus described this invention, what is claimed is:

1. An article transfer apparatus comprising article-engaging levers carried on a carrier which moves them from an article-engaging position to an article-disengaging position, said levers being pivotally mounted on the carrier for swinging movement, said levers carrying separate spaced cam followers, and separate spaced cams mounted so that the carrier will move relative thereto and engageable with the respective separate spaced cam followers so that the levers are successive under the control of the different cam followers and engaging cams during movement of the carrier relative to said cams.

2. An article transfer apparatus according to claim 1 comprising separate sets of cams for controlling different levers carried by the carrier, each of said separate sets of cams comprising a plurality of spaced cams which cooperate respectively with the separate spaced cam followers on the levers which that cam set controls.

3. An article transfer apparatus according to claim 1 in which each of said levers is pivoted to the carrier, and means for biasing each lever in one direction about its pivot so that at least one of the cam followers carried thereby will always be in engagement with its cooperating cam.

4. An article transfer apparatus for moving articles from an article-engaging position to an article-disengaging position, comprising a rotatable carrier, a plurality of article-engaging levers pivoted to said carrier at angularly spaced intervals, each of said levers having a plurality of separate cam-following rollers spaced thereon relative to each other and a pivot of the lever, a set of separate spaced cams for controlling swinging of said levers about their respective pivots, said cams being supported in a fixed position so that the carrier will move relative thereto with the separate rollers on each lever cooperating with the respective cams of the set.

5. An article transfer apparatus according to claim 4 in which separate sets of cams are provided for controlling alternate levers and each set includes separate spaced cams, the rollers of each lever being spaced thereon and located to cooperate with the spaced cams of its respective set.

6. An article transfer apparatus for moving articles from an article-engaging position to an article-disengaging position, comprising a carrier rotatable about a central vertical axis, a pair of vertically spaced cams in fixed position about said axis, a plurality of article-engaging levers pivoted to said carrier at angularly spaced intervals, each of said levers having a pair of rollers, disposed at different levels, the cams of said pair being at corresponding levels for cooperating with the respective rollers, and means for biasing each lever about its pivot so that at least one of its rollers is always engaged with a cooperating cam.

7. An article transfer apparatus according to claim 6 in which different sets of cams are provided for controlling alternate levers, all the cams of the different sets being at different levels and in fixed position relative to said axis and the respective rollers for cooperating therewith being at corresponding levels.

8. An article transfer apparatus comprising a carrier rotatable about a vertical axis, means for driving said carrier continuously, levers mounted on said carrier for engaging articles and moving them along a supporting surface adjacent said carrier, said levers being pivoted to said carrier at angularly spaced intervals, each of said levers having a pivot point and an outwardly extending article-engaging end, biasing means connected to each of said levers and tending to swing it substantially radially outwardly to project said end beyond the carrier and over said supporting surface, each of said levers also carrying a pair of cam following rollers at positions spaced radially from each other and from the lever pivot along the lever and also spaced vertically on the lever, and a pair of cams fixed about said vertical axis in vertically spaced relationship corresponding to the vertical spacing of said rollers on each of said levers for cooperating with the respective vertically spaced rollers to control swinging of said levers about their respective pivots.

9. Apparatus according to claim 8 in which the levers are divided into two alternating sets, a set of a pair of vertically spaced cams being provided for cooperating with the vertically spaced rollers of each respective set of levers, all of said cams being fixed about said axes and being spaced vertically in accordance with the vertical spacing of the rollers on the respective sets of levers.

References Cited by the Examiner
UNITED STATES PATENTS

| | | | |
|---|---|---|---|
| 1,974,931 | 9/34 | Rose | 198—25 |
| 2,609,946 | 9/52 | Brager | 198—25 |

SAMUEL F. COLEMAN, *Primary Examiner.*

ERNEST A. FALLER, JR., *Examiner.*